US009227327B2

(12) United States Patent
Nakahara

(10) Patent No.: US 9,227,327 B2
(45) Date of Patent: Jan. 5, 2016

(54) ROBOT SYSTEM AND METHOD FOR OPERATING ROBOT SYSTEM

(75) Inventor: Yoshimitsu Nakahara, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 346 days.

(21) Appl. No.: 13/396,602

(22) Filed: Feb. 15, 2012

(65) Prior Publication Data

US 2012/0265344 A1 Oct. 18, 2012

(30) Foreign Application Priority Data

Apr. 15, 2011 (JP) ................. 2011-091397

(51) Int. Cl.
*B25J 19/02* (2006.01)
*B25J 9/16* (2006.01)

(52) U.S. Cl.
CPC .............. *B25J 19/023* (2013.01); *B25J 9/1697* (2013.01); *G05B 2219/39468* (2013.01); *G05B 2219/50252* (2013.01)

(58) Field of Classification Search
CPC ..................... B25J 9/1697; G05B 2219/50252
USPC ........................................ 700/250, 252, 259
See application file for complete search history.

(56) References Cited

U.S. PATENT DOCUMENTS

| 5,040,056 | A | | 8/1991 | Sager et al. | |
|---|---|---|---|---|---|
| 5,297,238 | A | * | 3/1994 | Wang | B25J 9/1692 700/254 |
| 5,572,103 | A | * | 11/1996 | Terada | B25J 9/1656 318/568.11 |
| 5,608,847 | A | * | 3/1997 | Pryor | A01B 69/008 700/248 |
| 5,784,282 | A | * | 7/1998 | Abitbol et al. | 700/186 |
| 5,802,201 | A | * | 9/1998 | Nayar | B25J 9/1697 382/106 |
| 5,959,425 | A | * | 9/1999 | Bieman | G05B 19/4207 318/568.13 |
| 6,023,044 | A | * | 2/2000 | Kosaka | B23K 9/025 219/124.34 |
| 6,101,268 | A | * | 8/2000 | Gilliland | 382/152 |
| 6,137,902 | A | * | 10/2000 | Kinoshita et al. | 382/154 |
| 6,167,607 | B1 | * | 1/2001 | Pryor | A01B 69/008 29/407.04 |
| 6,362,813 | B1 | * | 3/2002 | Worn et al. | 345/169 |
| 6,408,224 | B1 | * | 6/2002 | Okamoto | B25J 9/1661 29/721 |
| 6,414,711 | B2 | * | 7/2002 | Arimatsu et al. | 348/86 |
| 6,430,472 | B1 | * | 8/2002 | Boillot | G05B 19/056 219/121.61 |
| 6,516,244 | B1 | * | 2/2003 | Yoo et al. | 700/218 |
| 6,650,998 | B1 | * | 11/2003 | Rutledge et al. | 707/705 |
| 6,956,347 | B2 | | 10/2005 | Nihei et al. | |

(Continued)

FOREIGN PATENT DOCUMENTS

| JP | 05-304814 | 11/1993 |
|---|---|---|
| JP | 08-304510 | 11/1996 |

(Continued)

OTHER PUBLICATIONS

Japanese Office Action for corresponding JP Application No. 2011-091397, Jun. 18, 2013.

(Continued)

*Primary Examiner* — Ian Jen
(74) *Attorney, Agent, or Firm* — Mori & Ward, LLP

(57) ABSTRACT

This robot system includes a first imaging portion detachably mounted to a robot arm and a control portion controlling the operation of the robot arm and a grasping portion, and the control portion is so formed as to detach the first imaging portion from the robot arm before moving an object to be grasped that is being grasped by the grasping portion to a prescribed processing position.

20 Claims, 13 Drawing Sheets

(56) References Cited

U.S. PATENT DOCUMENTS

| | | | |
|---|---|---|---|
| 7,136,723 B2* | 11/2006 | Hirayama et al. | 700/245 |
| 7,336,814 B2* | 2/2008 | Boca et al. | 382/141 |
| 7,395,150 B2* | 7/2008 | Ohira et al. | 701/450 |
| 7,424,342 B2* | 9/2008 | Beniyama et al. | 700/245 |
| 7,443,124 B2* | 10/2008 | Bischoff | B25J 9/1674 318/568.17 |
| 7,490,006 B2* | 2/2009 | Sekine et al. | 701/532 |
| 7,526,121 B2* | 4/2009 | Ban | G01B 11/25 382/154 |
| 7,605,347 B2* | 10/2009 | Izawa | B23K 9/032 219/124.34 |
| 7,698,060 B2* | 4/2010 | Nomura | 701/455 |
| 7,715,946 B2* | 5/2010 | Watanabe et al. | 700/245 |
| 7,720,573 B2* | 5/2010 | Yamada | B25J 19/023 700/245 |
| 7,782,451 B2 | 8/2010 | Matsumoto et al. | |
| 7,817,847 B2* | 10/2010 | Hashimoto et al. | 382/153 |
| RE41,924 E* | 11/2010 | Nemets et al. | 250/559.4 |
| 7,844,104 B2* | 11/2010 | Tropf | G06K 9/00201 382/153 |
| 7,996,114 B2* | 8/2011 | Ban | B25J 9/1697 382/153 |
| 8,051,051 B2* | 11/2011 | Nomura | 707/694 |
| 8,082,064 B2* | 12/2011 | Kay | 700/259 |
| 8,175,801 B2* | 5/2012 | Tu et al. | 701/410 |
| 8,321,375 B2* | 11/2012 | Nomura | 707/616 |
| 8,335,830 B2* | 12/2012 | Jablokov et al. | 709/206 |
| 8,428,876 B2* | 4/2013 | Lee | 701/532 |
| 8,478,522 B2* | 7/2013 | Ohira et al. | 701/450 |
| 8,559,699 B2* | 10/2013 | Boca | B25J 9/1679 382/153 |
| 8,565,515 B2* | 10/2013 | Fujieda et al. | 382/154 |
| 8,571,793 B2* | 10/2013 | Matsunaga | 701/461 |
| 8,600,552 B2* | 12/2013 | Nakajima | B25J 9/1697 700/245 |
| 8,606,400 B2* | 12/2013 | Izumi et al. | 700/248 |
| 8,654,193 B2* | 2/2014 | Taneno et al. | 348/135 |
| 8,706,300 B2* | 4/2014 | Krause et al. | 700/259 |
| 2002/0070981 A1* | 6/2002 | Kida | 345/833 |
| 2002/0091485 A1* | 7/2002 | Mikuriya et al. | 701/208 |
| 2004/0080294 A1 | 4/2004 | Nihei et al. | |
| 2005/0159842 A1 | 7/2005 | Ban et al. | |
| 2005/0203937 A1* | 9/2005 | Nomura | 707/102 |
| 2007/0211240 A1 | 9/2007 | Matsumoto et al. | |
| 2007/0266055 A1* | 11/2007 | Nomura | 707/200 |
| 2013/0241931 A1* | 9/2013 | Mai et al. | 345/428 |

FOREIGN PATENT DOCUMENTS

| | | |
|---|---|---|
| JP | 10-006268 | 1/1998 |
| JP | 2004-142015 | 5/2004 |
| JP | 2007-240434 | 9/2007 |
| JP | 2011-000669 | 1/2011 |

OTHER PUBLICATIONS

Extended European Search Report for corresponding EP Application No. 12155103.0-2316, Jun. 12, 2012.

Japanese Decision of Rejection for corresponding JP Application No. 2011-091397, Jan. 28, 2014.

Chinese Office Action for corresponding CN Application No. 201210048344.0, Jul. 29, 2014.

Chinese Office Action for corresponding CN Application No. 201210048344.0, Mar. 6, 2015.

* cited by examiner

ROBOT SYSTEM AND METHOD FOR OPERATING ROBOT SYSTEM

CROSS-REFERENCE TO RELATED APPLICATIONS

The priority application number JP2011-091397, Robot System and Method for Operating Robot System, Apr. 15, 2011, Yoshimitsu Nakahara, upon which this patent application is based is hereby incorporated by reference.

BACKGROUND OF THE INVENTION

1. Field of the Invention

The present, invention relates to a robot system and a method for operating a robot system.

2. Description of the Background Art

Japanese Patent Laying-Open No. 2011-000669 discloses a robot system (working articulated robot system) including a dual-arm robot and a camera fixedly mounted to a first robot arm of the dual-arm robot. The robot system according to the aforementioned Japanese Patent Laying-Open No. 2011-000669 is so formed as to take images of a work that is being grasped by a hand unit mounted on the first robot arm of the dual-arm robot by the camera mounted to the first robot arm while rotating the work and detect a mark on the work.

SUMMARY OF THE INVENTION

A robot system according to an aspect of an embodiment includes a robot arm to be mounted with a grasping portion, a first imaging portion to take an image of an object to be grasped and confirm a position of the object to be grasped, detachably mounted to the robot arm, and a control portion configured to operate the robot arm and the grasping portion, while the control portion is configured to operate the robot arm to detach the first imaging portion from the robot arm before moving the object to be grasped that is being grasped by the grasping portion to a prescribed processing position.

A method for operating a robot system according to an aspect of the embodiment includes taking an image of an object to be grasped and confirming a position of the object to be grasped by an imaging portion detachably mounted to a robot arm, detaching the imaging portion from the robot arm, grasping the object to be grasped by a grasping portion mounted to the robot arm, and moving the object to be grasped that is being grasped by the grasping portion to a prescribed processing position in a state where the imaging portion is detached from the robot arm.

DESCRIPTION OF THE EMBODIMENTS

An embodiment is now described with reference to the drawings.

First, the structure of a robot system 100 according to this embodiment is described with reference to FIGS. 1 and 2.

Figure 1:
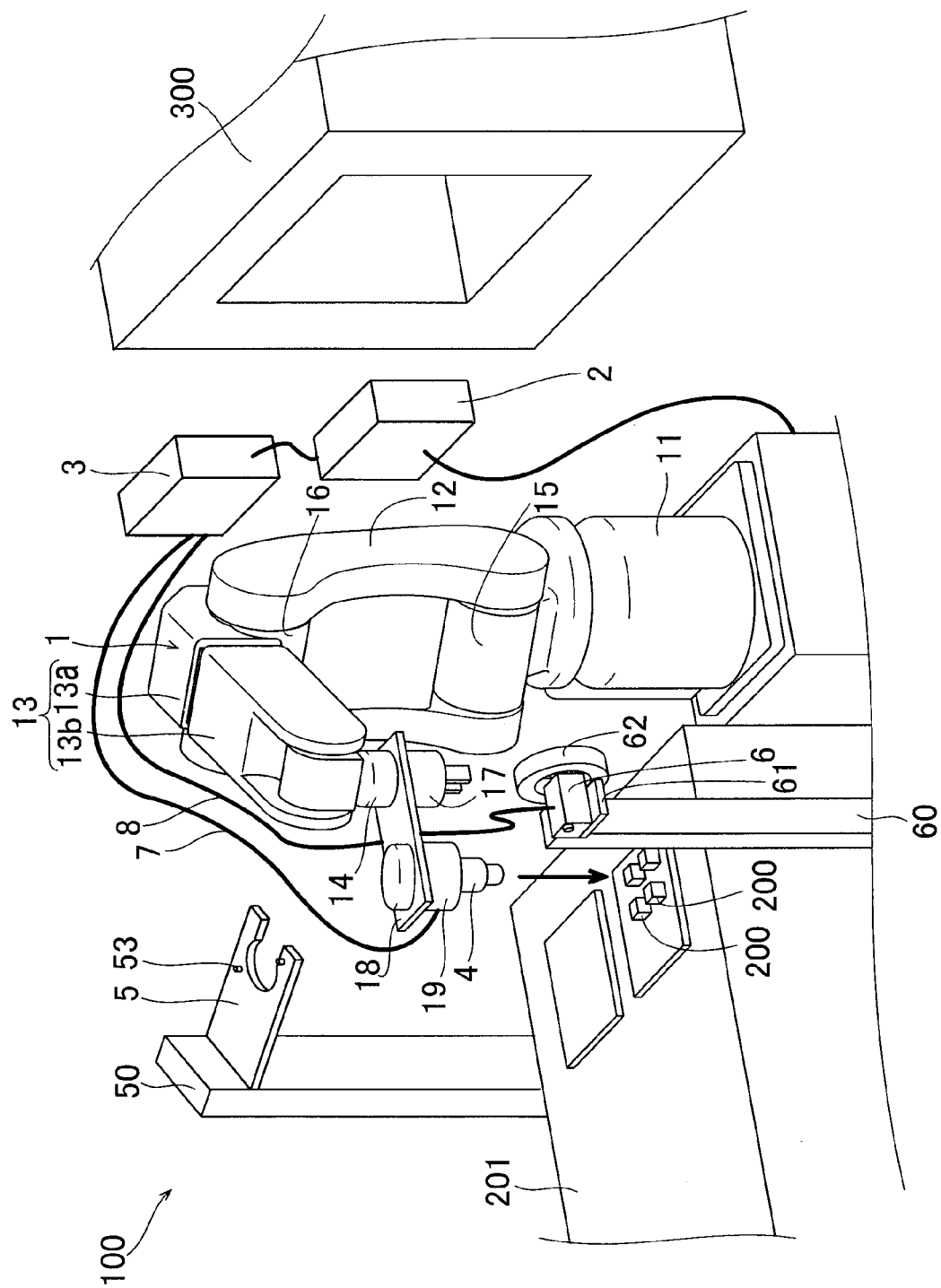
FIG. 1 is an overall view of a robot system according to an embodiment.

As shown in FIG. 1, the robot system 100 includes a robot 1, a robot controller 2 controlling the overall operation of the robot system 100, an image processing system 3 to process an image, a position confirmation camera 4 to confirm the positions of works 200, a placement portion 5 to place the position confirmation camera 4, and an examination camera 6 to examine the works 200. A workbench 201 is arranged adjacent to the robot system 100, and a plurality of the works 200 (four works 200 in this embodiment) are placed on the workbench 201. A processing machine 300 to process the works 200 is arranged adjacent to the robot system 100. The position confirmation camera 4 is an example of the "first imaging portion". The examination camera 6 is an example of the "second imaging portion". The works 200 are examples of the "object to be grasped".

Figure 2:
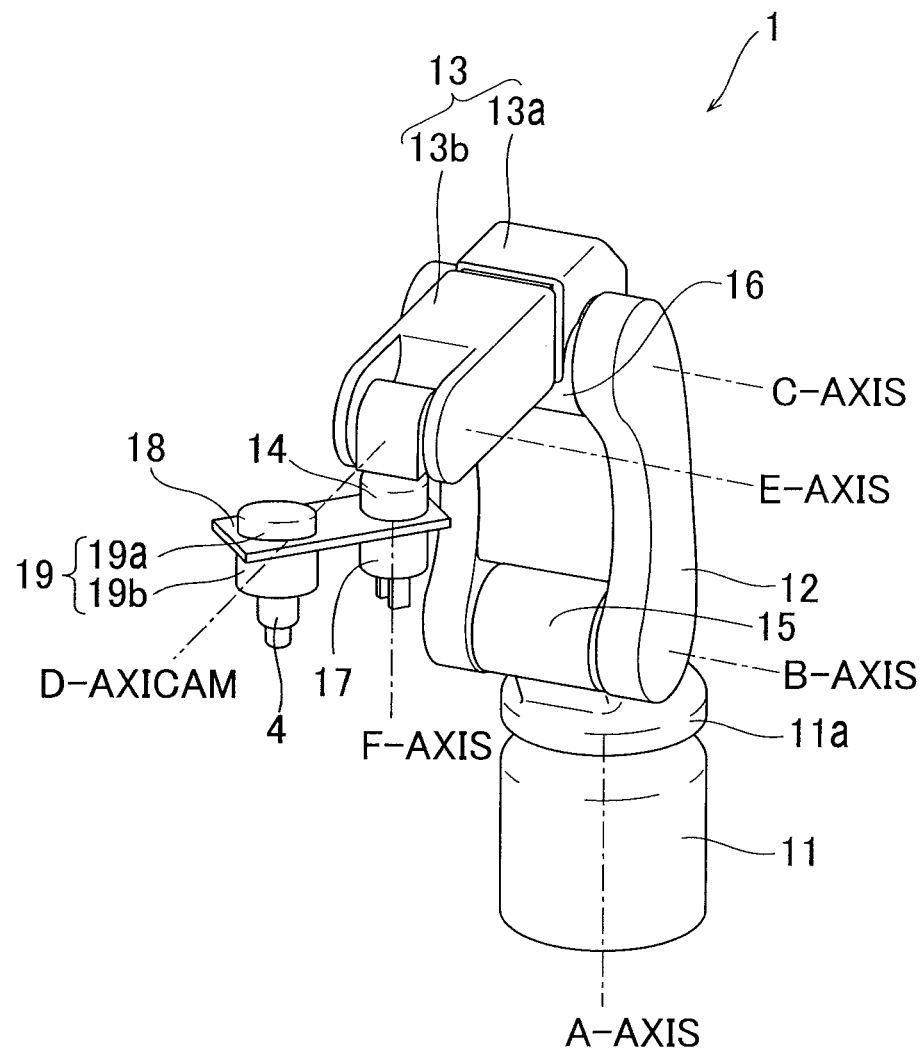
FIG. 2 is an overall view of a robot of the robot system according to the embodiment.

As shown in FIG. 2, the robot 1 is constituted by a base 11, a lower arm 12, an upper arm 13, and a wrist joint 14. The base 11 is provided with a rotating portion 11a, and the rotating portion 11a is formed to be rotatable about an A-axis. The base 11 and the lower arm 12 are connected to each other by a first joint 15. The first joint 15 is formed to rotate the lower arm 12 about a B-axis. The lower arm 12 and the upper arm 13 are connected to each other by a second joint 16. The upper arm 13 includes a first upper arm portion 13a connected to the second joint 16 and a second upper arm portion 13b connected to the wrist joint 14. The second joint 16 is formed to rotate the upper arm 13 about a C-axis. The second upper arm portion 13b is formed to rotate about a D-axis. The wrist joint 14 is formed to rotate about an E-axis and an F-axis. In other words, the robot 1 is constituted by a six-axis vertical articulated robot rotatable about the A-axis to the F-axis. A hand portion 17 to grasp the works 200 is mounted on an end of the wrist joint 14. A camera mounting 18 to mount the position confirmation camera 4 is provided on the wrist joint 14. The lower arm 12, the upper arm 13, and the wrist joint 14 are examples of the "robot arm".

The position confirmation camera 4 is detachably mounted on the camera mounting 18 through a camera attaching/detaching portion 19. The camera attaching/detaching portion 19 includes an automatic tool changer (A.T.C.), for example. This camera attaching/detaching portion 19 is constituted by a body portion 19a and an attaching/detaching portion 19b. The attaching/detaching portion 19b is attached to the position confirmation camera 4, and fixed to the body portion 19a by the pressure of air. Thus, the position confirmation camera 4 is mounted to the wrist joint 14 (camera mounting 18). The position confirmation camera 4 includes a camera body, a lens, and a light. According to this embodiment, the position confirmation camera 4 is provided to take an image of the plurality of works 200 and confirm the positions of the works 200. The position confirmation camera 4 and the image processing system 3 are connected to each other by a wire 7 (see FIG. 1), and the examination camera 6 and the image processing system 3 are connected to each other by a wire 8 (see FIG. 1). When the position confirmation camera 4 is detached from the camera mounting 18, the wire 7 in addition to the position confirmation camera 4 is detached from the robot 1. The wires 7 and 8 are made of a shielded wire obtained by covering a signal wire, for example. The camera attaching/detaching portion 19 is an example of the "imaging portion attaching/detaching portion".

Figure 3:
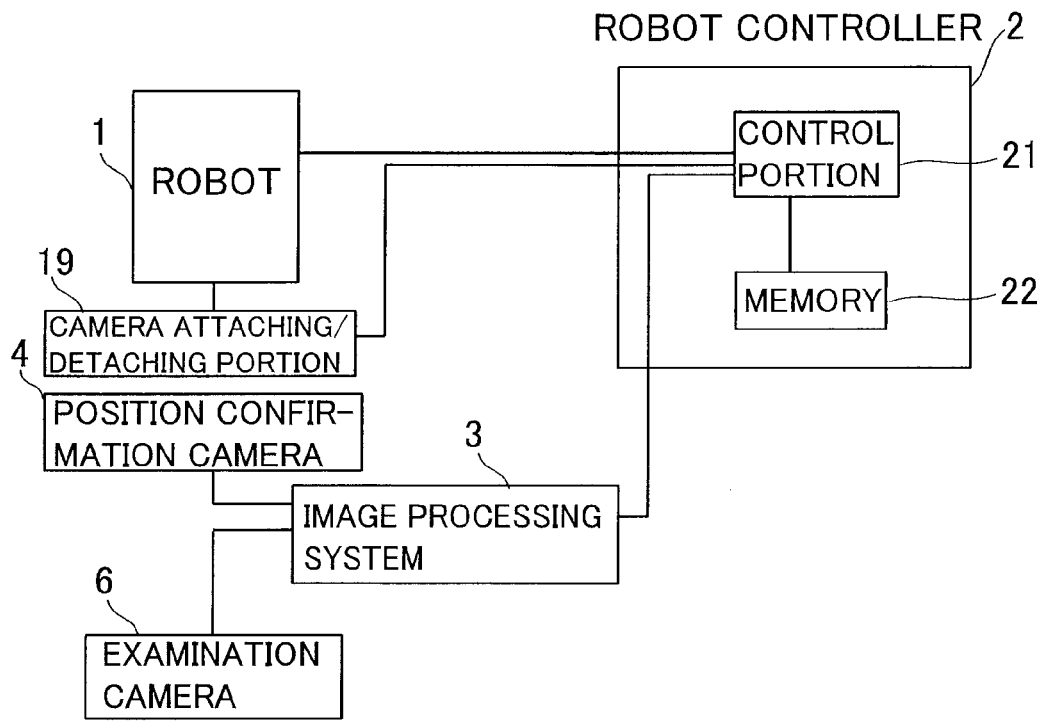
FIG. 3 is a block diagram of the robot system according to the embodiment.

As shown in FIG. 3, the robot controller 2 is provided with a control portion 21 and a memory 22. The memory 22 is connected to the control portion 21. The robot 1 and the image processing system 3 are connected to the control portion 21 of the robot controller 2. The camera attaching/detaching portion 19 to attach/detach the position confirmation camera 4 is connected to the control portion 21 of the robot controller 2. The position confirmation camera 4 and the examination camera 6 are connected to the image processing system 3. According to this embodiment, the control portion 21 is configured to control the camera attaching/detaching portion 19 to detach the position confirmation camera 4 from the camera mounting 18 mounted on the wrist joint 14 after confirming the positions of the plurality of works 200 (all four works 200 in this embodiment) on the basis of the image taken by the position confirmation camera 4 and before moving a work 200 that is being grasped by the hand portion 17 to the processing machine 300.

Figure 4:
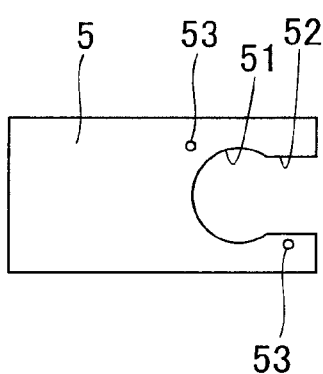
FIG. 4 is a plan view of a placement portion to place a position confirmation camera of the robot system according to the embodiment.

As shown in FIG. 1, the placement portion 5 to place the position confirmation camera 4 detached from the camera mounting 18 is mounted on a pillar portion 50. As shown in FIG. 4, the placement portion 5 is provided in the form of a plate, and provided with a hole 51 into which the position confirmation camera 4 is inserted. The hole 51 is so provided as to be continuous with a notch 52 provided on one end of the placement portion 5 in the form of a plate. The position confirmation camera 4 is directly inserted into the hole 51 from above, or inserted into the hole 51 through the notch 52 in an oblique direction (transverse direction). According to this embodiment, the placement portion 5 is provided with bosses 53 to position the position confirmation camera 4 when the position confirmation camera 4 detached from the camera mounting 18 is placed. A plurality of the bosses 53 (two bosses 53 in this embodiment) are so provided as to hold the position confirmation camera 4 therebetween in plan view in a state where the position confirmation camera 4 is placed on the placement portion 5 (see FIG. 9). The bosses 53 are examples of the "positioning portion".

The examination camera 6 is fixedly mounted on a placement portion 61 mounted on a pillar portion 60. A ring-shaped lighting portion 62 is attached to the examination camera 6. A plurality of LEDs (not shown) are attached to the ring-shaped lighting portion 62. The lighting portion 62 is provided to emit light to the work 200 that is being grasped by the hand portion 17. According to this embodiment, the robot system 100 is so formed that images of the work 200 are taken (the work 200 is examined) by the examination camera 6 after the position confirmation camera 4 is detached from the camera mounting 18 and the work 200 is grasped by the hand portion 17.

The processing machine 300 (see FIG. 1) has a function of processing (cutting, machining, lathing, grinding, NC machining, or the like) the works. When the works 200 are processed in the processing machine 300, dust generated when the works 200 are processed, coolant to cool the processing machine 300, oil, etc. are generated in the processing machine 300.

Next, operations of the control portion 21 of the robot system 100 are described with reference to FIGS. 1 and 5 to 15.

First, the position confirmation camera 4 is mounted on the camera mounting 18 of the robot 1, and the robot 1 is so driven (operated) that the position confirmation camera 4 is arranged above the works 200 on the workbench 201, as shown in FIG. 1. Then, an image of the works 200 is taken by the position confirmation camera 4 in the state where the position confirmation camera 4 is arranged above the works 200, as shown at a step S1 in FIG. 5. According to this embodiment, an image of all the works 200 (four works 200) is taken. The image taken by the position confirmation camera 4 is processed by the image processing system 3, and processed data is transmitted to the robot controller 2 to be stored in the memory 22. The robot controller 2 calculates (confirms) positions where the works 200 are arranged on the basis of the data stored in the memory 22. Then, the control portion 21 advances to a step S2.

Figure 5:
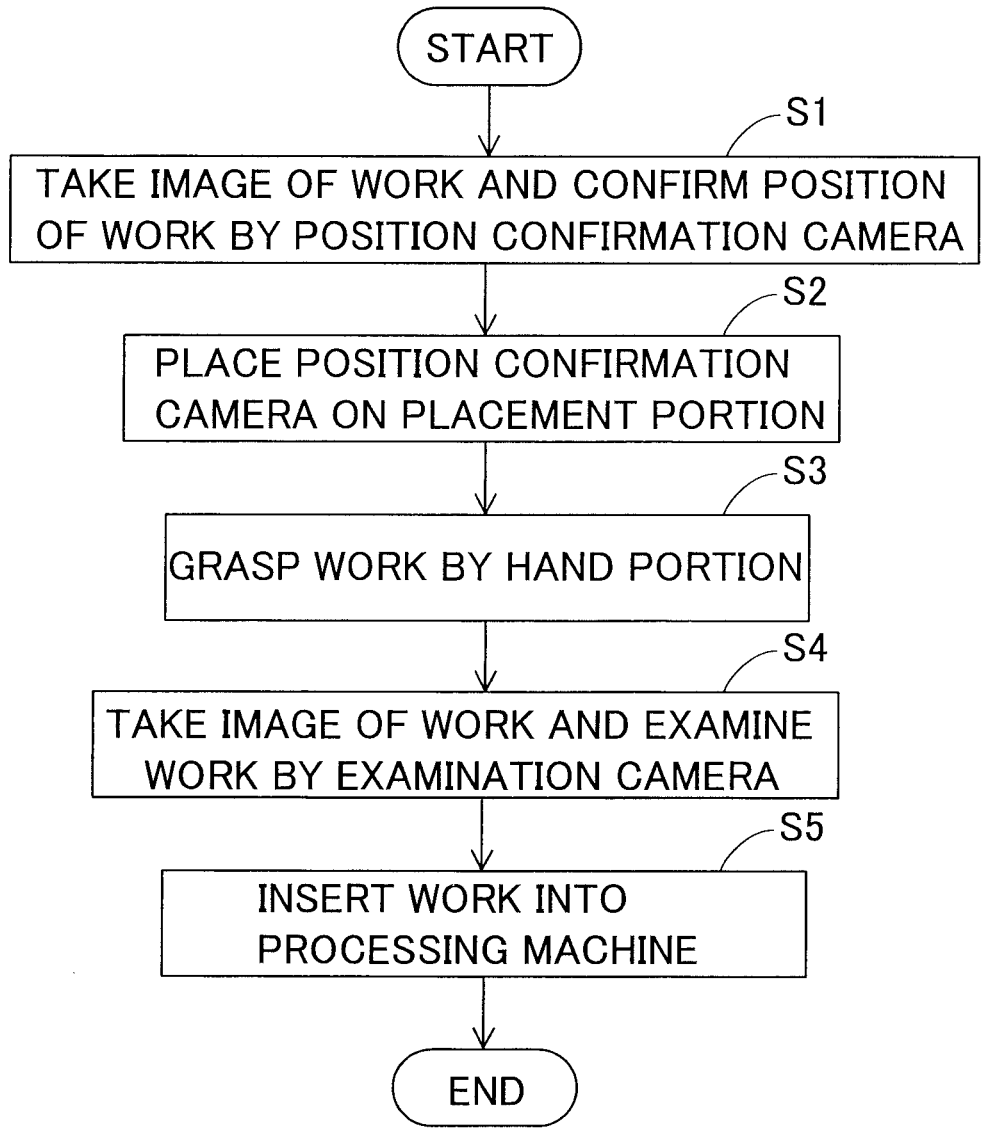
FIG. 5 is a flowchart for illustrating operations of the robot system according to the embodiment.
Figure 6:
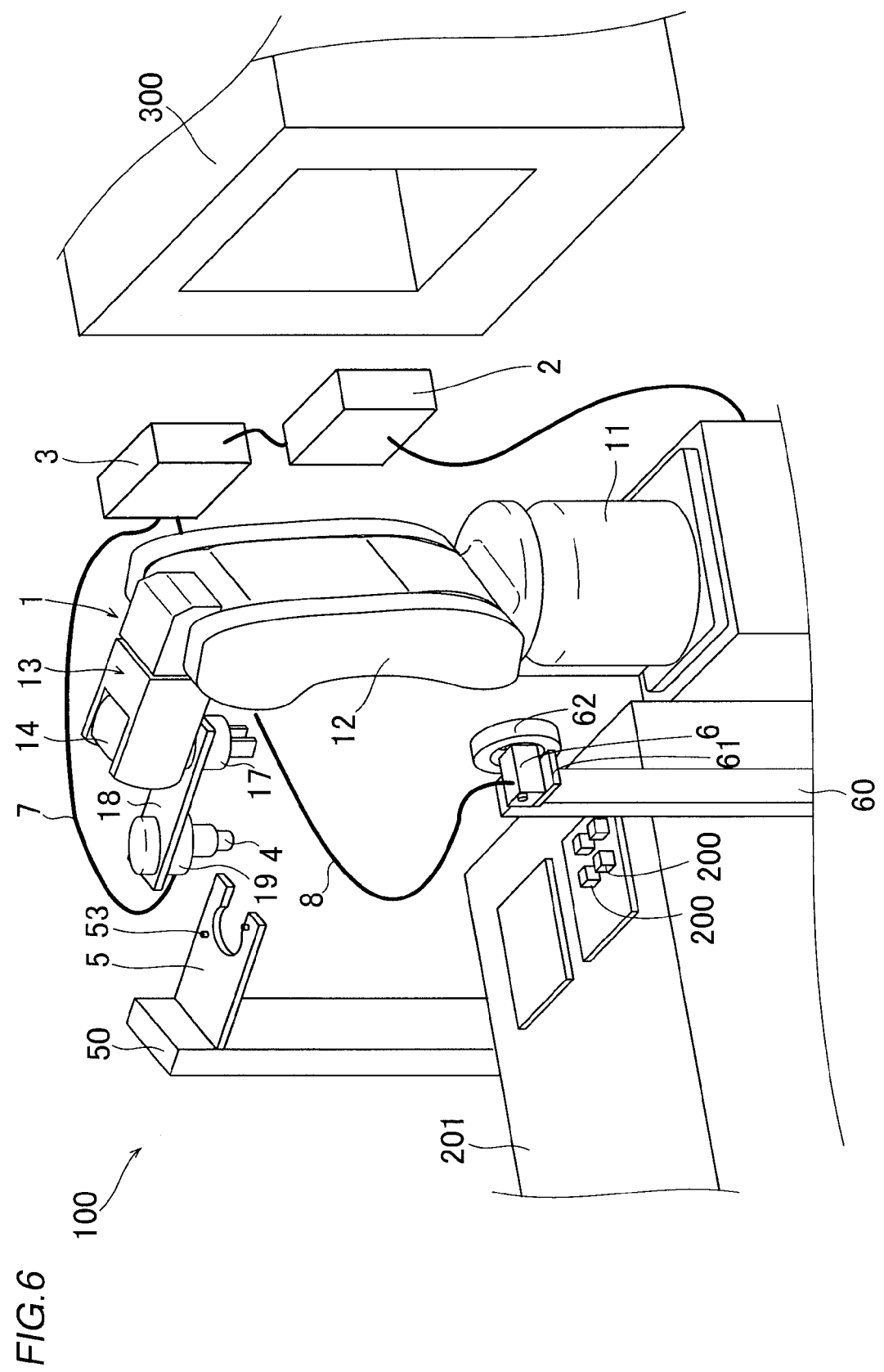
FIG. 6 is a diagram showing a state of moving the position confirmation camera of the robot system according to the embodiment to the placement portion.
Figure 7:
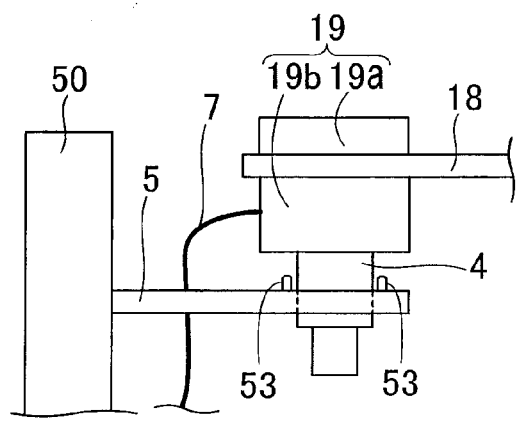
FIG. 7 is a side elevational view showing a state of inserting the position confirmation camera of the robot system according to the embodiment into the placement portion.
Figure 8:
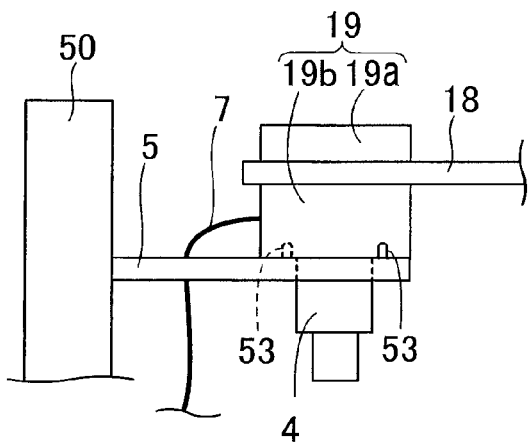
FIG. 8 is a side elevational view showing a state of placing the position confirmation camera of the robot system according to the embodiment on the placement portion.
Figure 9:
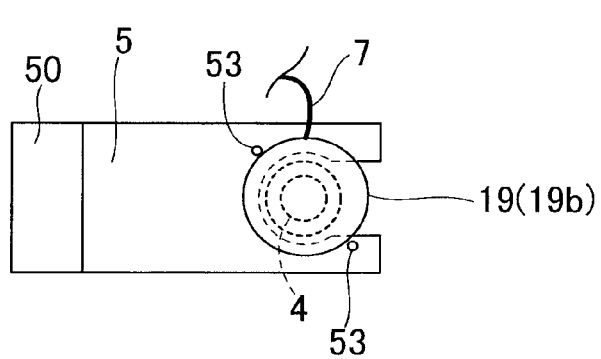
FIG. 9 is a top plan view showing a state of placing the position confirmation camera of the robot system according to the embodiment on the placement portion.

As shown in FIG. 5, the robot 1 (the rotating portion 11a of the base 11, the first joint 15, the second joint 16, and the wrist joint 14) is so driven (operated) that the position confirmation camera 4 is moved near the placement portion 5 as shown in FIG. 6 at the step S2. Then, the position confirmation camera 4 is inserted into the hole 51 of the placement portion 5 along the bosses 53, as shown in FIG. 7, and the position confirmation camera 4 is placed on the placement portion 5, as shown in FIG. 8. In a state where the position confirmation camera 4 is placed on the placement portion 5, the outer surface of the camera attaching/detaching portion 19 (attaching/detaching portion 19b) comes into contact with the two bosses 53 as shown in FIG. 9 so that the camera attaching/detaching portion 19 (position confirmation camera 4) is positioned. Thereafter, the camera attaching/detaching portion 19 operates to detach the position confirmation camera 4 from the camera mounting 18 (wrist joint 14). At this time, the wire 7 in addition to the position confirmation camera 4 is also detached from the camera mounting 18. Then, the control portion 21 advances to a step S3.

Figure 10:
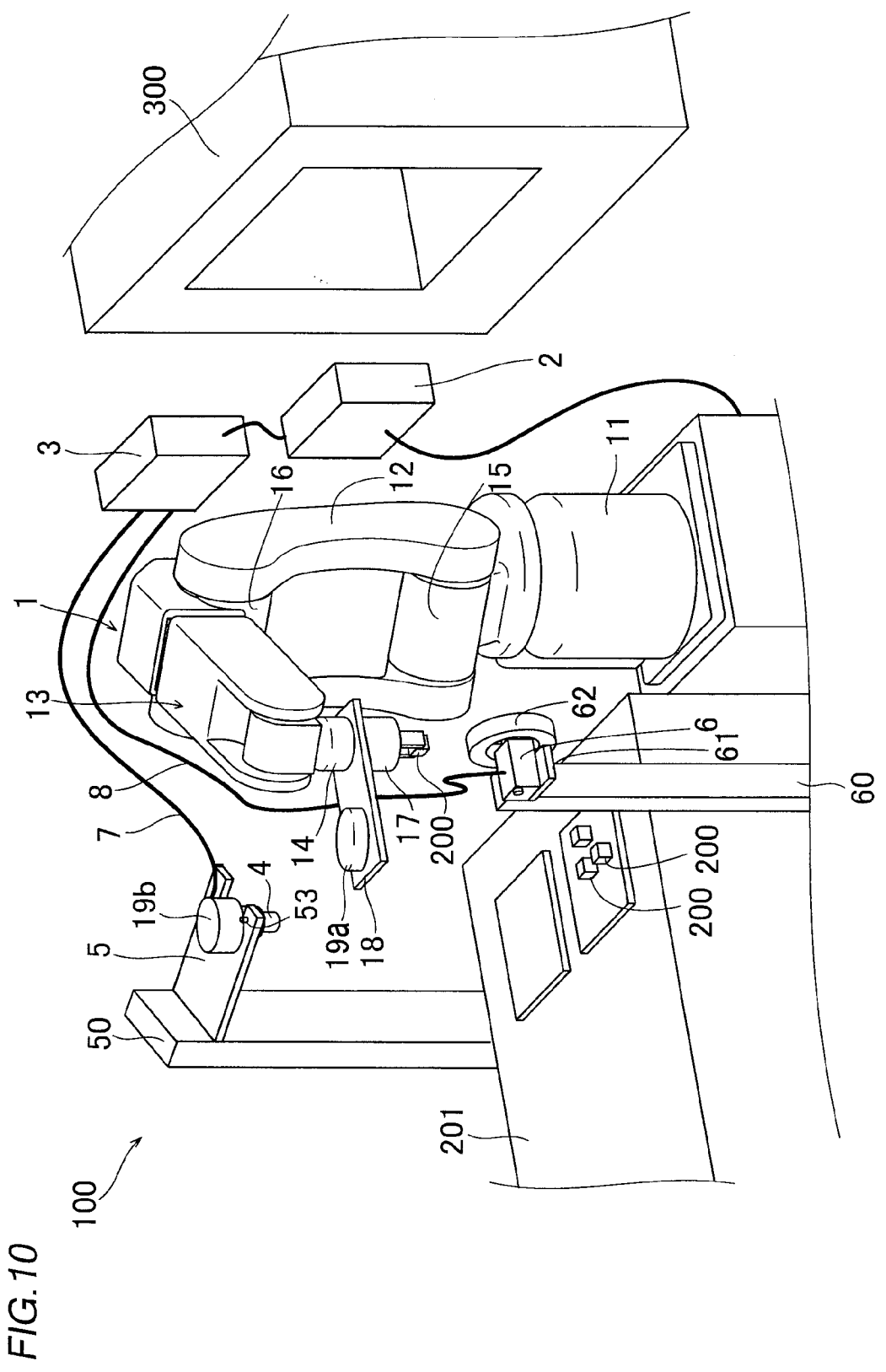
FIG. 10 is a diagram showing a state of grasping a work by a hand portion of the robot system according to the embodiment.

As shown in FIG. 5, the robot 1 is so driven (operated) on the basis of the positions where the works 200 are arranged, calculated (confirmed) by the robot controller 2 that one of the works 200 is grasped by the hand portion 17 as shown in FIG. 10 at the step S3. Then, the control portion 21 advances to a step S4.

Figure 11:
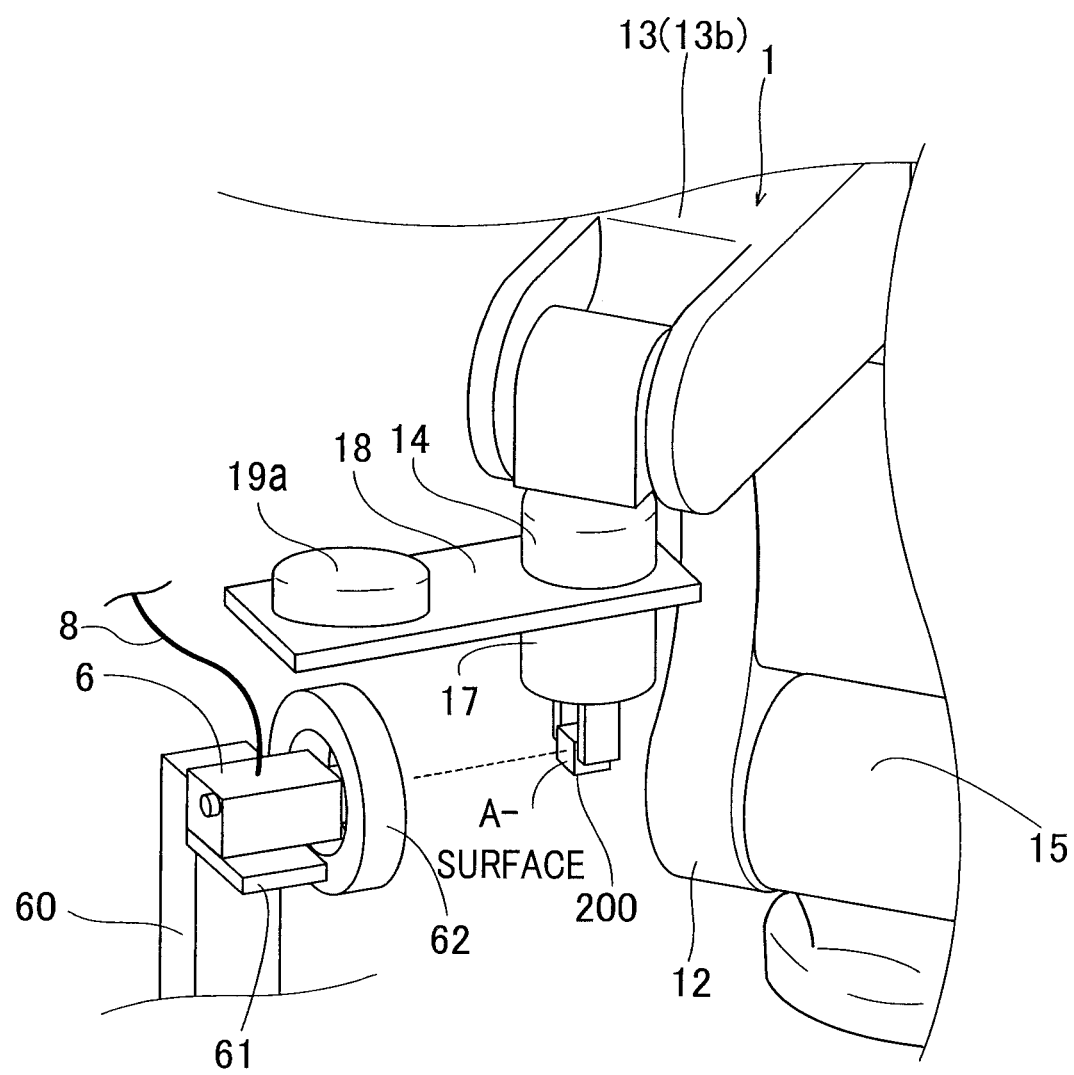
FIG. 11 is a diagram showing a state of examining (taking an image of) the work by an examination camera of the robot system according to the embodiment.

As shown in FIG. 5, the robot 1 is so driven (operated) that the work 200 that is being grasped by the hand portion 17 is arranged in front of the examination camera 6 as shown in FIG. 11, and images of the work 200 are taken by the examination camera 6 at the step S4. At this time, the ring-shaped lighting portion 62 emits light to the work 200 that is being grasped by the hand portion 17. Thus, an image of an A-surface of the work 200 is taken.

Figure 12:
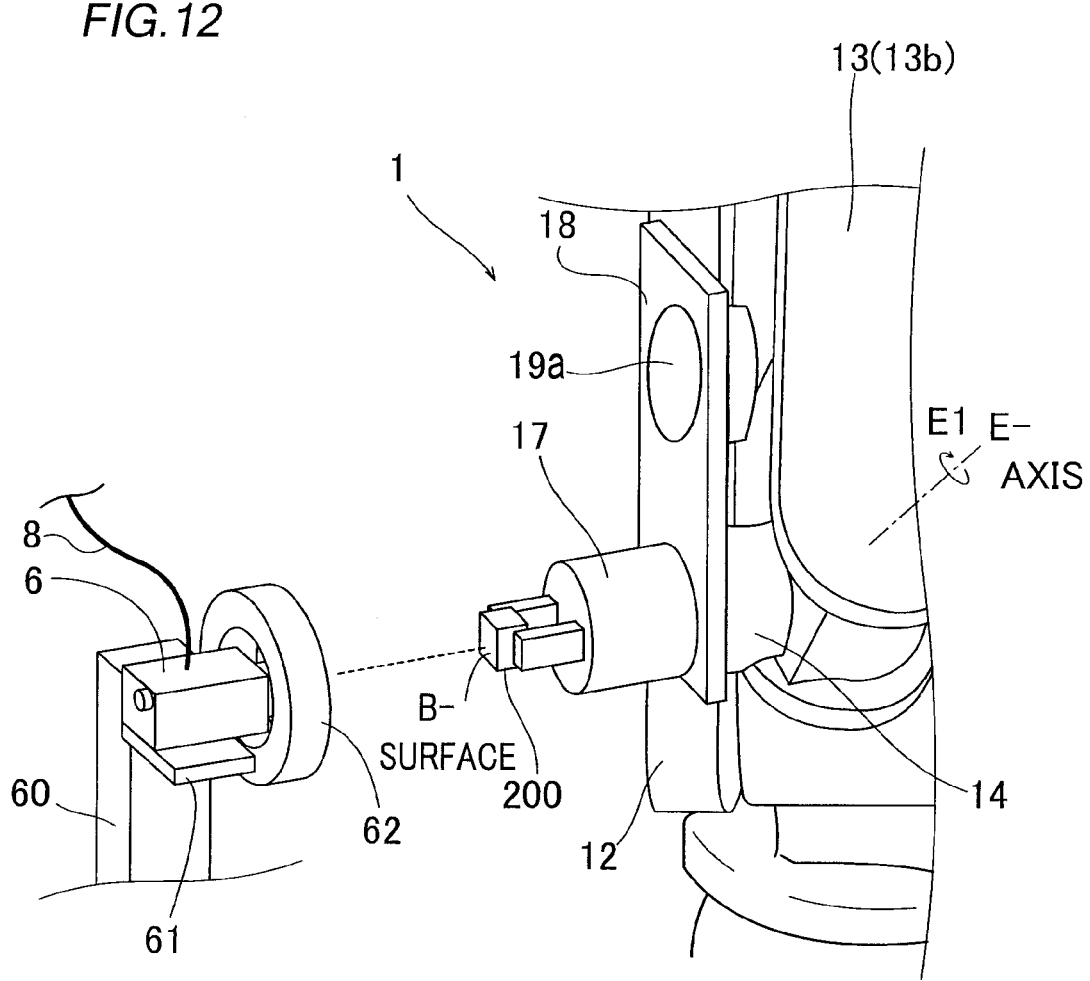
FIG. 12 is a diagram showing a state of examining (taking an image of) the work by rotating the hand portion by 90° in a direction E1 about an E-axis from the state shown in FIG. 11.

As shown in FIG. 12, the wrist joint 14 is rotated by 90° in a direction E1 about the E-axis from the state shown in FIG. 11 to change the posture of the work 200, and an image of the work 200 is taken by the examination camera 6. Thus, an image of a B-surface of the work 200 is taken. The robot system 100 may be configured to take an image of the work 200 once after the work 200 is postured as shown in FIG. 12, or may be configured to take images of the work 200 continuously during rotation of the wrist joint 14.

Figure 13:
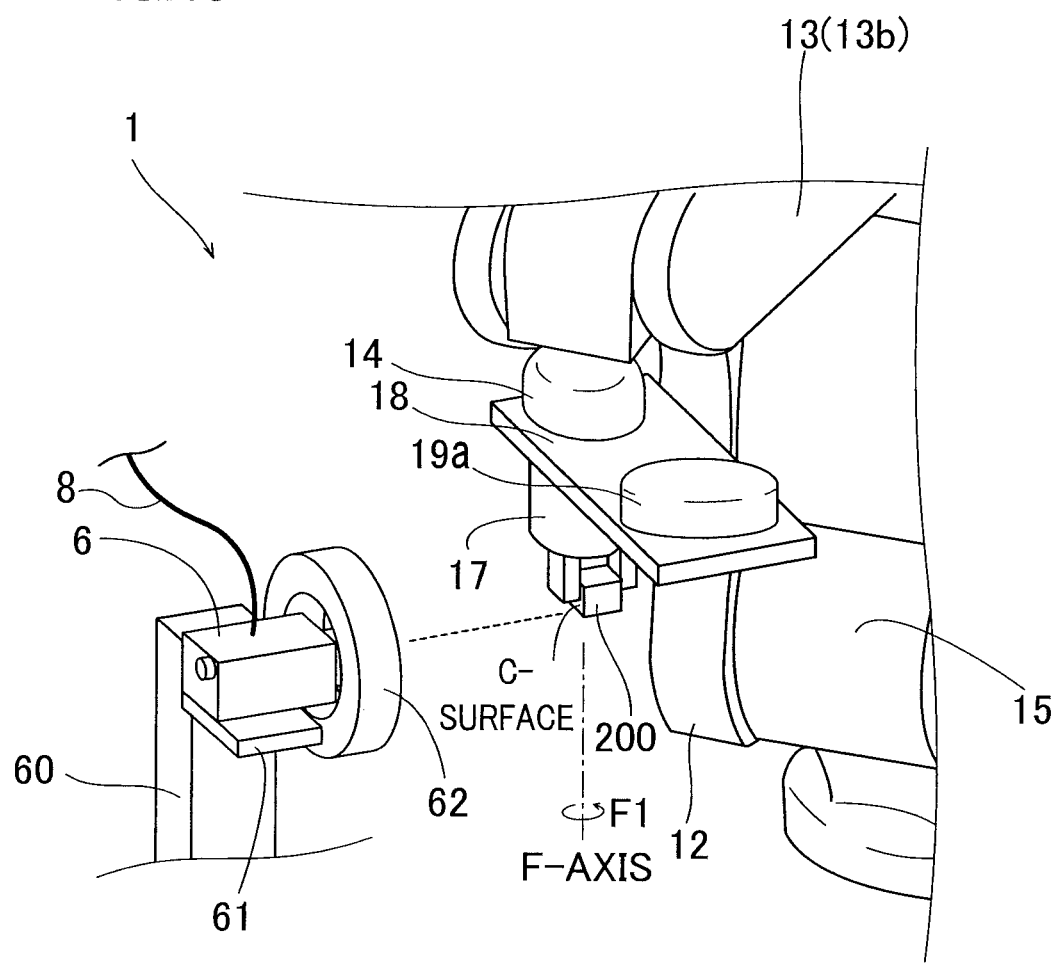
FIG. 13 is a diagram showing a state of examining (taking an image of) the work by rotating the hand portion by 90° in a direction F1 about an F-axis from the state shown in FIG. 11.

As shown in FIG. 13, the wrist joint 14 is rotated by 90° in a direction F1 about the F-axis from the state shown in FIG. 11 to change the posture of the work 200, and an image of the work 200 is taken by the examination camera 6. Thus, an image of a C-surface of the work 200 is taken.

Figure 14:
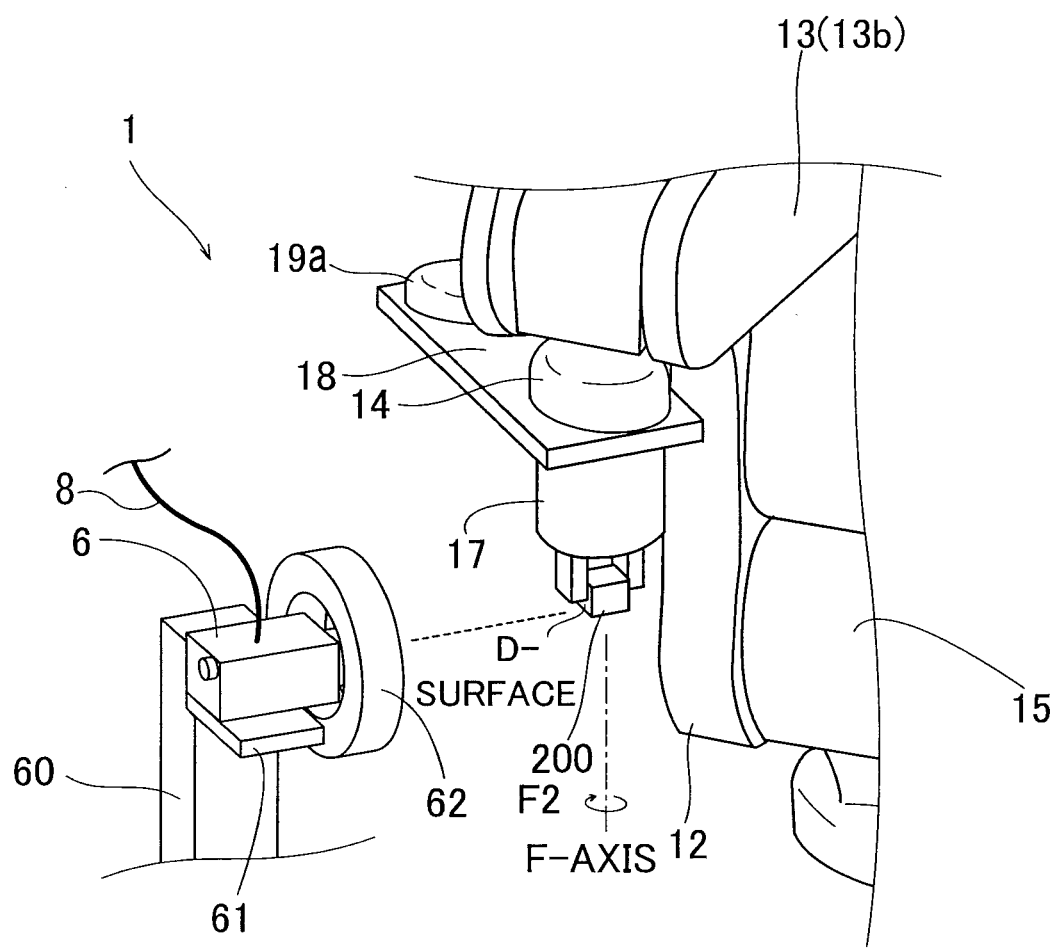
FIG. 14 is a diagram showing a state of examining (taking an image of) the work by rotating the hand portion by 90° in a direction F2 about the F-axis from the state shown in FIG. 11.

As shown in FIG. 14, the wrist joint 14 is rotated by 90° in a direction F2 about the F-axis from the state shown in FIG. 11 to change the posture of the work 200, and an image of the work 200 is taken by the examination camera 6. Thus, an image of a D-surface of the work 200 is taken. The images taken by the examination camera 6 are processed by the image processing system 3, and processed data is transmitted to the robot controller 2 to be stored in the memory 22. The robot controller 2 examines whether or not the surface of the work 200 is scratched, whether or not the work 200 is deformed, etc., for example, on the basis of the data stored in the memory 22. Then, the control portion 21 advances to a step S5.

Figure 15:
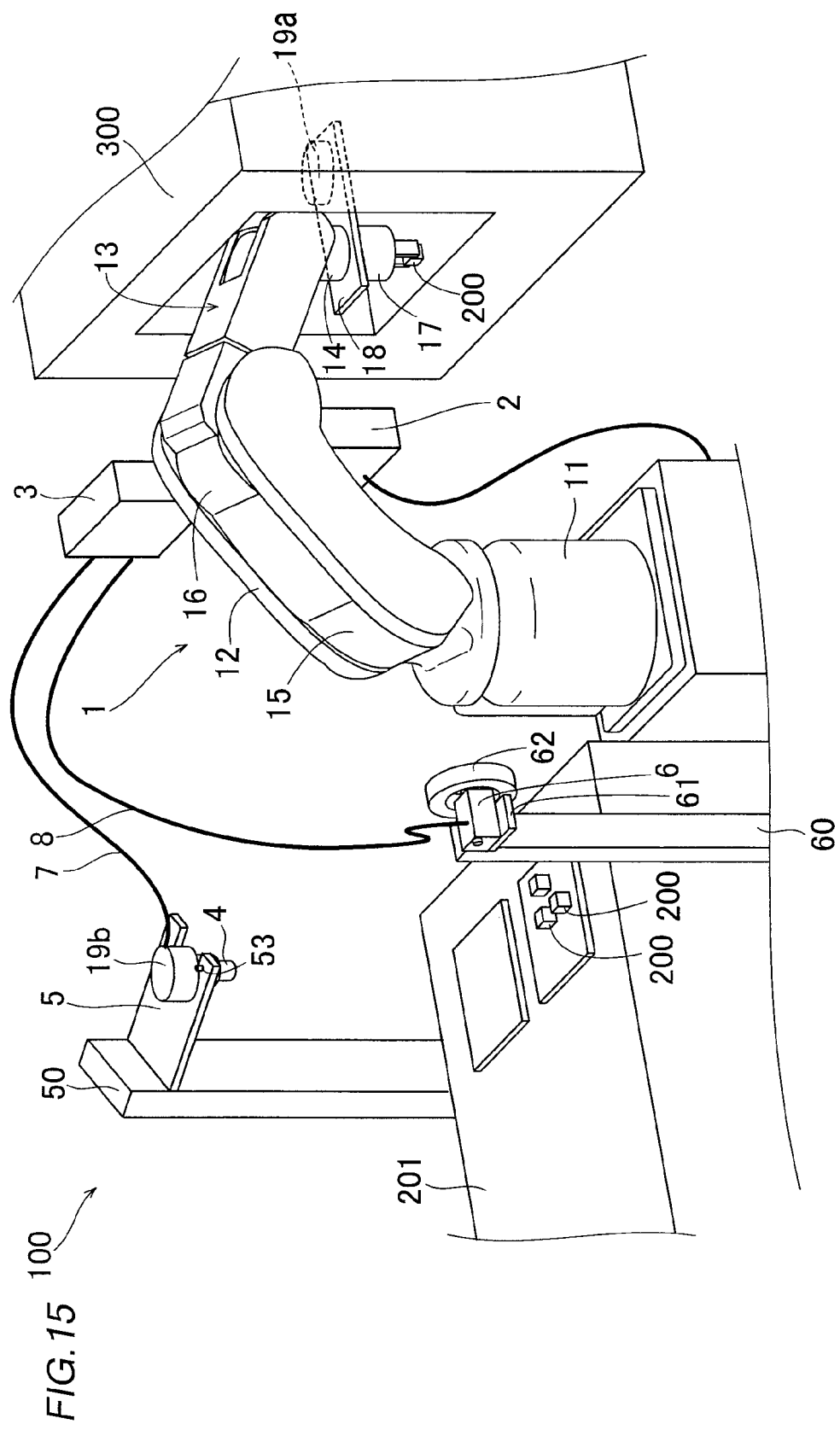
FIG. 15 is a diagram showing a state of inserting the work into a processing machine by the hand portion of the robot system according to the embodiment.

As shown in FIG. 5, the robot 1 is so driven (operated) that the work 200 is inserted into the processing machine 300 as shown in FIG. 15 at the step S5, and the work 200 is processed. Thereafter, the steps S3 to S5 are so repeated that all the works 200 are processed.

According to this embodiment, as hereinabove described, the control portion 21 controls the camera attaching/detaching portion 19 to detach the position confirmation camera 4 from the wrist joint 14 (camera mounting 18) before moving the work 200 that is being grasped by the hand portion 17 into the processing machine 300, whereby the position confirmation camera 4 has been already detached from the wrist joint 14 when the work 200 that is being grasped by the hand portion 17 is moved into the processing machine 300 (adverse environment), and hence degradation in the performance of the position confirmation camera 4 due to oil, dust, etc. in the adverse environment can be suppressed.

According to this embodiment, as hereinabove described, the control portion 21 is configured to control the camera attaching/detaching portion 19 to detach the position confirmation camera 4 from the wrist joint 14 after taking an image of the works 200 and confirming the positions of the plurality of works 200 (all four works 200) by the position confirmation camera 4 and before grasping the work 200 by the hand portion 17 and moving the work 200 into the processing machine 300. Thus, the position confirmation camera 4 is detached from the wrist joint 14 after the positions of the plurality of works 200 (all four works 200) are confirmed, and hence the position confirmation camera 4 only needs to be detached once, so that processing of the works 200 by the robot system 100 can be performed in a short time, dissimilarly to a case where the position confirmation camera 4 is detached and attached each time the position of one work 200 is confirmed.

According to this embodiment, as hereinabove described, the robot system 100 is provided with the camera attaching/detaching portion 19 to detachably mount the position confirmation camera 4 to the wrist joint 14, and the control portion 21 is configured to control the camera attaching/detaching portion 19 to detach the position confirmation camera 4 from the wrist joint 14 before moving the work 200 that is being grasped by the hand portion 17 into the processing machine 300. Thus, the position confirmation camera 4 can be easily detached from the wrist joint 14 by controlling the camera attaching/detaching portion 19.

According to this embodiment, as hereinabove described, the robot system 100 is provided with the placement portion 5 to place the position confirmation camera 4 detached from the wrist joint 14, and the control portion 21 is configured to control the robot 1 to move the wrist joint 14 to the placement portion 5, control the camera attaching/detaching portion 19 to detach the position confirmation camera 4 from the wrist joint 14, and place the position confirmation camera 4 on the placement portion 5, before moving the work 200 that is being grasped by the hand portion 17 into the processing machine 300. Thus, the position confirmation camera 4 is placed on the placement portion 5, and hence the position confirmation camera 4 can be easily attached to the wrist joint 14 by moving the wrist joint 14 to the placement portion 5 even when the position confirmation camera 4 detached from the wrist joint 14 is reattached to the wrist joint 14, for example.

According to this embodiment, as hereinabove described, the placement portion 5 is provided with the bosses 53 to position the position confirmation camera 4 when the position confirmation camera 4 detached from the wrist joint 14 is placed. Thus, the position confirmation camera 4 can be easily positioned on the placement portion 5, and hence the position confirmation camera 4 can be reliably attached to the wrist joint 14 when the position confirmation camera 4 detached from the wrist joint 14 is reattached to the wrist joint 14.

According to this embodiment, as hereinabove described, the plurality of bosses 53 are so provided as to hold the position confirmation camera 4 therebetween in plan view (top view). Thus, the position confirmation camera 4 can be reliably positioned on the placement portion 5.

According to this embodiment, as hereinabove described, the notch 52 is so provided in the placement portion 5 as to be continuous with the hole 51, whereby the position confirmation camera 4 can be directly inserted into the hole 51 from above, and the position confirmation camera 4 can be inserted into the hole 51 through the notch 52 in the oblique direction (transverse direction). Thus, the position confirmation camera 4 can be easily placed on the placement portion 5.

According to this embodiment, as hereinabove described, the robot system 100 is so formed that the position confirmation camera 4 and the image processing system 3 are connected to each other by the wire 7, and the wire 7 in addition to the position confirmation camera 4 is detached from the wrist joint 14 when the position confirmation camera 4 is detached from the wrist joint 14. Thus, the wire 7 in addition to the position confirmation camera 4 is detached from the wrist joint 14, whereby the wire 7 made of a relatively thin signal wire can be suppressed from cutting due to operations of the wrist joint 14 even if the wire 7 is made of a shielded wire or the like obtained by covering a signal wire.

According to this embodiment, as hereinabove described, the robot system 100 is provided with the examination camera 6 to take images of the work 200 and examine the work 200, and the control portion 21 is configured to control the camera attaching/detaching portion 19 to detach the position confirmation camera 4 from the wrist joint 14 after taking an image of the works 200 and confirming the positions of the works 200 by the position confirmation camera 4, and thereafter control the robot 1 to move the work 200 into the processing machine 300 after grasping the work 200 by the hand portion 17, and taking images of the work 200 that is being grasped by the hand portion 17 and examining the work 200 by the examination camera 6. Thus, a scratch or the like on the surface of the work 200 can be detected, and hence a poor work 200 can be suppressed from being processed by the processing machine 300.

Although the present invention has been described and illustrated in detail, it is clearly understood that the same is by way of illustration and example only and is not to be taken by way of limitation, the spirit and scope being limited only by the terms of the appended claims.

For example, while the position confirmation camera is mounted to the wrist joint of the robot in the aforementioned embodiment, the present invention is not restricted to this. The position confirmation camera may alternatively be mounted to a portion such as the upper arm of the robot, other than the wrist joint, for example.

While the robot inserts the work that is being grasped by the hand portion into the processing machine in the aforementioned embodiment, the present invention is not restricted to this. The robot may alternatively dispose the work in an adverse environment (environment where processing such as painting is performed, for example) other than the processing machine after the position confirmation camera is detached, for example.

While the position confirmation camera is detached after taking an image of all the works and confirming the positions of the works by the position confirmation camera in the aforementioned embodiment, the present invention is not restricted to this. The position confirmation camera may alternatively be detached after taking an image of some (or an image of one) of all the works and confirming the positions of some (or the position of one) of all the works, for example.

While the camera attaching/detaching portion includes an automatic tool changer (A.T.C.) in the aforementioned embodiment, the present invention is not restricted to this. In the embodiment, the camera attaching/detaching portion may alternatively include a device (such as an electromagnet) other than an automatic tool changer (A.T.C.).

While the placement portion to place the position confirmation camera is provided with the bosses to position the position confirmation camera in the aforementioned embodiment, the present invention is not restricted to this. The placement portion may alternatively be provided with a wall member to position the position confirmation camera, for example.

While the placement portion to place the position confirmation camera is provided with the two bosses to position the position confirmation camera in the aforementioned embodiment, the present invention is not restricted to this. The placement portion may alternatively be provided with one or more than two bosses, for example.

While the robot system is provided with the single robot in the aforementioned embodiment, the present invention is not restricted to this. In the embodiment, the robot system may alternatively be provided with a plurality of robots, and each of the plurality of robots may alternatively be provided with the detachable position confirmation camera.

Figure 16:
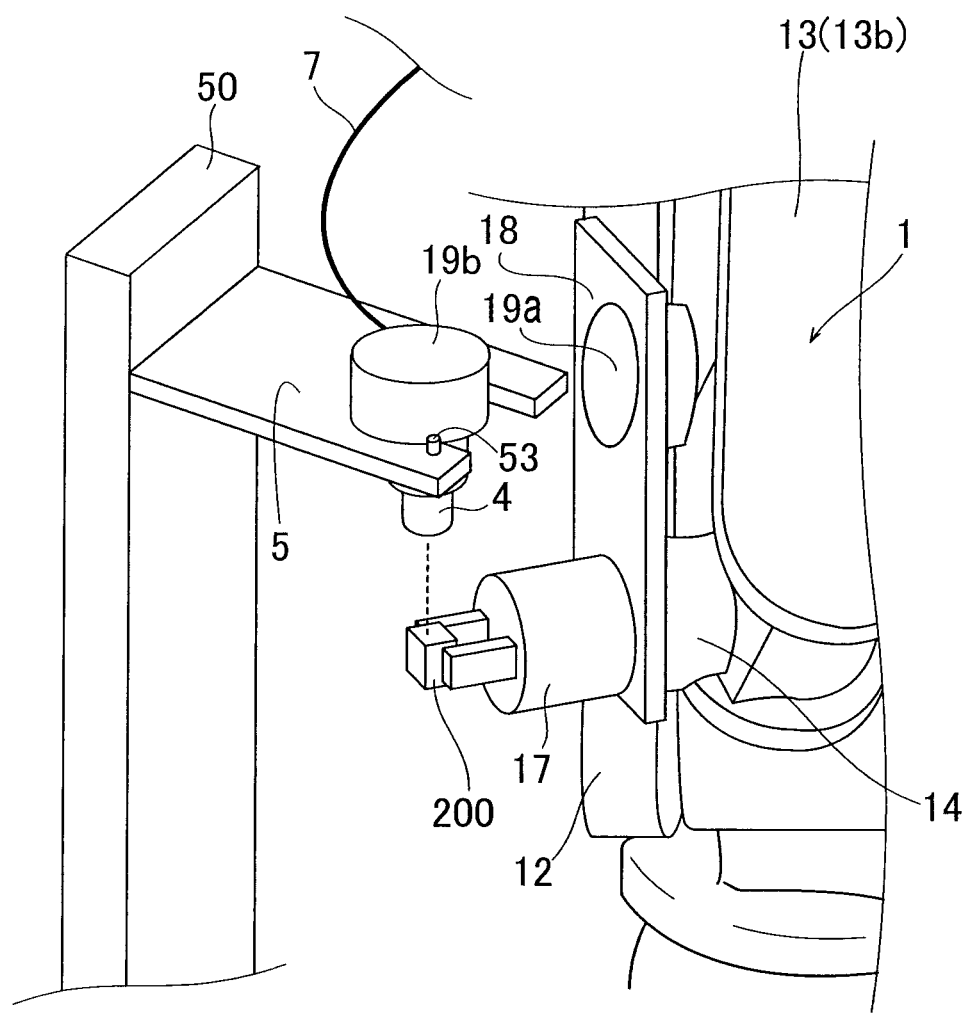
FIG. 16 is a diagram showing a state of examining (taking an image of) a work by a position confirmation camera of a robot system according to a modification of the embodiment.

While the position confirmation camera and the examination camera are separately provided in the aforementioned embodiment, the present invention is not restricted to this. For example, the robot system may alternatively be configured to take an image of the works and confirm the positions of the works by the position confirmation camera, detach the position confirmation camera from the arm of the robot and place the same on the placement portion, and thereafter take images of the work and examine the work by the position confirmation camera having been placed on the placement portion, as in a modification shown in FIG. 16. Thus, the position confirmation camera can also serve as the examination camera, and hence the structure of the robot system can be simplified.

What is claimed is:

1. A robot system comprising:
a robot arm to be mounted with a grasping portion;
a first imaging portion to take an image of an object to be grasped and confirm a position of the object to be grasped, detachably mounted to the robot arm; and
a control portion configured to operate the robot arm and the grasping portion, wherein
the object to be grasped includes a plurality of objects to be grasped, and
the control portion is configured to operate the robot arm to detach the first imaging portion from the robot arm after taking an image of the plurality of unmoving objects to be grasped at one time and confirming positions of the plurality of objects to be grasped by the first imaging portion mounted to the robot arm before an object to be grasped of the plurality of objects to be grasped is firstly grasped by the grasping portion and is moved to a prescribed processing position, and then to move sequentially the object to be grasped that is being grasped by the grasping portion to a prescribed processing position.

2. The robot system according to claim 1, further comprising an imaging portion attaching/detaching portion to detachably mount the first imaging portion to the robot arm, wherein
the control portion is configured to control the imaging portion attaching/detaching portion to detach the first imaging portion from the robot arm before moving the object to be grasped that is being grasped by the grasping portion to the prescribed processing position.

3. The robot system according to claim 2, wherein
the imaging portion attaching/detaching portion includes an automatic tool changer to detachably mount the first imaging portion to the robot arm by pressure of air, and
the control portion is so firmed as to control the pressure of the air of the automatic tool changer to detach the first imaging portion from the robot arm before moving the object to be grasped that is being grasped by the grasping portion to the prescribed processing position.

4. The robot system according to claim 2, further comprising a placement portion to place the first imaging portion detached from the robot arm, wherein
the control portion is so formed as to move the robot arm to the placement portion, control the imaging portion attaching/detaching portion to detach the first imaging portion from the robot arm, and place the first imaging portion on the placement portion, before moving the object to be grasped that is being grasped by the grasping portion to the prescribed processing position.

5. The robot system according to claim 4, wherein
the placement portion is provided with a positioning portion to position the first imaging portion when the first imaging portion detached from the robot arm is placed.

6. The robot system according to claim 5, wherein
a plurality of the positioning portions are so provided as to hold the first imaging portion therebetween.

7. The robot system according to claim 4, wherein
the placement portion is provided with a hole into which the first imaging portion is inserted, and
the control portion is so formed as to place the first imaging portion on the placement portion by inserting the robot arm into the hole of the placement portion before moving the object to be grasped that is being grasped by the grasping portion to the prescribed processing position.

8. The robot system according to claim 7, wherein
the placement portion is provided with a notch continuous with the hole, and
the control portion is so formed as to place the first imaging portion on the placement portion by inserting the robot arm into the hole through the notch of the placement portion before moving the object to be grasped that is being grasped by the grasping portion to the prescribed processing position.

9. The robot system according to claim 1, further comprising an image processing system to process the image taken by the first imaging portion, wherein
the first imaging portion and the image processing system are connected to each other by a wire, and
the wire in addition to the first imaging portion is detached from the robot arm when the first imaging portion is detached from the robot arm.

10. The robot system according to claim 1, further comprising a second imaging portion to take an image of the object to be grasped and examine the object to be grasped, wherein
the control portion is so formed as to detach the first imaging portion from the robot arm after taking the image of the object to be grasped and confirming the position of the object to be grasped by the first imaging portion, grasp the object to be grasped by the grasping portion, take the image of the object to be grasped that is being grasped by the grasping portion and examine the object to be grasped that is being grasped by the grasping portion by the second imaging portion, and thereafter move the object to be grasped to the prescribed processing position.

11. The robot system according to claim 10, wherein,
the first imaging portion to take the image of the object to be grasped and confirm the position of the object to be grasped and the second imaging portion to take the image of the object to be grasped and examine the object to be grasped are constituted by a same imaging portion, and
the control portion is so formed as to detach the imaging portion from the robot arm after taking the image of the object to be grasped and confirming the position of the object to be grasped by the imaging portion, grasp the object to be grasped by the grasping portion, and take the image of the object to be grasped that is being grasped by the grasping portion and examine the object to be grasped that is being grasped by the grasping portion by the imaging portion having been detached from the robot arm.

12. The robot system according to claim 11, further comprising a placement portion to place the imaging portion detached from the robot arm, wherein
the control portion is so formed as to detach the imaging portion from the robot arm and place the imaging portion on the placement portion after taking the image of the object to be grasped and confirming the position of the object to be grasped by the imaging portion, grasp the object to be grasped by the grasping portion, and take the image of the object to be grasped that is being grasped by the grasping portion and examine the object to be grasped that is being grasped by the grasping portion by the imaging portion having been placed on the placement portion.

13. The robot system according to claim 1, wherein
the control portion is so formed as to detach the first imaging portion from the robot arm before moving the object to be grasped that is being grasped by the grasping portion into a processing machine.

14. A method for operating a robot system, comprising:
taking an image of an object to be grasped and confirming a position of the object to be grasped by an imaging portion detachably mounted to a robot arm;
detaching the imaging portion from the robot arm;
grasping the object to be grasped by a grasping portion mounted to the robot arm; and
moving the object to be grasped that is being grasped by the grasping portion to a prescribed processing position in a state where the imaging portion is detached from the robot arm, wherein
the object to be grasped includes a plurality of objects to be grasped, and
when the imaging portion is detached from the robot arm, the imaging portion is detached from the robot arm after taking an image of the plurality of unmoving objects to be grasped at one time and confirming positions of the plurality of objects to be grasped by the imaging portion mounted to the robot arm before an object to be grasped of the plurality of objects to be grasped is firstly grasped by the grasping portion and is moved to a prescribed processing position, and then to move sequentially the object to be grasped that is being grasped by the grasping portion to the prescribed processing position.

15. The method for operating a robot system according to claim 14, wherein
when the imaging portion is detached from the robot arm, an imaging portion attaching/detaching portion to detachably mount the imaging portion to the robot arm is controlled to detach the imaging portion from the robot arm before the object to be grasped that is being grasped by the grasping portion is moved to the prescribed processing position.

16. The method for operating a robot system according to claim 15, wherein
when the imaging portion attaching/detaching portion is controlled to detach the imaging portion from the robot arm, the robot arm is moved to a placement portion to place the imaging portion detached from the robot arm, the imaging portion attaching/detaching portion is controlled to detach the imaging portion from the robot arm, and the imaging portion is placed on the placement portion, before the object to be grasped that is being grasped by the grasping portion is moved to the prescribed processing position.

17. The method for operating a robot system according to claim 16, wherein
the placement portion is provided with a positioning portion to position the imaging portion when the imaging portion detached from the robot arm is placed.

18. The method for operating a robot system according to claim 17, wherein
a plurality of the positioning portions are so provided as to hold the imaging portion therebetween in plan view.

19. The robot system according to claim 1, wherein
the control portion is so formed as to detach the first imaging portion from the robot arm after taking the image of the plurality of objects to be grasped and confirming the position of the plurality of objects to be grasped by the first imaging portion, and thereafter sequentially grasp and move each object of the plurality of objects to be grasped to the prescribed processing position prior to reattaching the first imaging portion to the robot arm.

20. The method for operating a robot system according to claim 14, wherein
when the imaging portion is detached from the robot arm after taking the image of the plurality of objects to be grasped and confirming the positions of the plurality of objects to be grasped by the imaging portion, each object of the plurality of objects to be grasped are thereafter sequentially grasped and moved to the prescribed processing position prior to reattaching the first imaging portion to the robot arm.

* * * * *